United States Patent [19]

Whetstone

[11] 4,025,379
[45] May 24, 1977

[54] METHOD OF MAKING LAMINATED MAGNETIC MATERIAL

[76] Inventor: Clayton N. Whetstone, 1100 Penn Center Blvd., Apt. 1117, Pittsburgh, Pa. 15235

[22] Filed: Feb. 18, 1975

[21] Appl. No.: 550,731

Related U.S. Application Data

[60] Division of Ser. No. 356,893, May 3, 1973, Pat. No. 3,880,603, which is a continuation-in-part of Ser. No. 79,864, Oct. 12, 1970, Pat. No. 3,756,788.

[52] U.S. Cl. .............................. 156/306; 29/609; 29/603; 148/1.5; 148/121; 148/31.55; 148/122; 336/219; 336/234; 360/126; 428/539; 428/620; 428/900

[51] Int. Cl.² .......................................... C09J 5/00

[58] Field of Search .................. 156/89, 306, 155; 428/325, 900, 433, 539, 457, 538; 29/187.5, 195 S, 194, 609, 603, 195 G; 148/1.5, 121, 122, 31.55, 100; 336/219, 234; 360/126; 264/66, 235, 83, 346; 228/193, 194; 427/101, 127

[56] References Cited

UNITED STATES PATENTS

| | | | |
|---|---|---|---|
| 2,221,983 | 11/1940 | Mayer et al. | 175/21 |
| 2,269,523 | 1/1942 | Deutsch | 29/189 |
| 2,753,623 | 7/1956 | Bassenkool et al. | 29/497.5 |
| 2,809,422 | 10/1957 | Schultz | 29/497.5 |
| 2,853,402 | 9/1958 | Blois | 117/71 |
| 2,917,643 | 12/1959 | Mihanowich | 310/42 |
| 3,089,228 | 5/1963 | Lynch | 29/194 |
| 3,269,004 | 8/1966 | Smith et al. | 29/471.1 |
| 3,271,718 | 9/1966 | Shaw | 336/219 |
| 3,350,180 | 10/1967 | Croll | 29/183.5 |
| 3,375,091 | 3/1968 | Feldtkeller | 29/194 |
| 3,381,366 | 5/1968 | Winter | 29/472.3 |
| 3,400,450 | 9/1968 | Nock et al. | 29/497.5 |
| 3,418,710 | 12/1968 | Seidel et al. | 29/609 |
| 3,478,415 | 11/1969 | Selman | 29/497.5 |
| 3,479,156 | 11/1969 | Ginder | 29/183.5 |
| 3,516,076 | 6/1970 | Stein | 340/174 |
| 3,604,103 | 9/1971 | Bouchak et al. | 29/472.3 |
| 3,682,606 | 8/1972 | Anderson et al. | 29/196.2 |

FOREIGN PATENTS OR APPLICATIONS

| | | |
|---|---|---|
| 279,727 | 7/1968 | Austria |
| 130,548 | 6/1942 | Austria |
| 38,939 | 4/1887 | Germany |
| 433,507 | 9/1967 | Switzerland |
| 384,189 | 12/1932 | United Kingdom |
| 572,491 | 10/1945 | United Kingdom |
| 573,780 | 12/1945 | United Kingdom |
| 587,374 | 4/1947 | United Kingdom |
| 652,918 | 5/1951 | United Kingdom |
| 909,647 | 10/1962 | United Kingdom |
| 911,518 | 11/1962 | United Kingdom |
| 949,409 | 2/1964 | United Kingdom |
| 983,332 | 2/1965 | United Kingdom |
| 993,501 | 5/1965 | United Kingdom |
| 998,332 | 7/1965 | United Kingdom |
| 1,034,862 | 7/1966 | United Kingdom |
| 1,077,377 | 7/1967 | United Kingdom |

*Primary Examiner*—Charles E. Van Horn
*Assistant Examiner*—J. J. Gallagher
*Attorney, Agent, or Firm*—Griffin, Branigan and Butler

[57] ABSTRACT

An extrusion billet is fabricated from layers of soft magnetic material separated by one or more metal layers. The billet is coreduced and heat treated to impart the desired magnetic properties to the soft magnetic material and also to form intermetallic insulating layers between the magnetic layers. Electric field shield sections are formed in a similar manner by placing relatively thick layers of copper between adjacent layers of metal located adjacent to the layers of soft magnetic material. The layers of soft magnetic metal can also be separated by a layer of semiconductor material; or a metal foil having a semiconductor-forming or high electrical resistivity forming material deposited thereon. In the latter case no extrusion is required. Instead, pressure and heat cause the materials to react and form either a semiconductor layer or a layer with an electrical resistivity higher than about $10^{-4}$ ohm-cm between adjacent layers of soft magnetic metal. Even the deposition step is eliminated by separating and bonding the layers of soft magnetic metal with glass so long as the glass and soft magnetic metal have similar coefficients of thermal expansion.

29 Claims, 9 Drawing Figures

METHOD OF MAKING LAMINATED MAGNETIC MATERIAL

BACKGROUND OF THE INVENTION

This is a division of application serial number 356,893, filed May 3, 1973 -- now U.S. Pat. 3,880,603 dated Apr. 29, 1975 which, in turn, is a continuation-in-part of Ser. No. 79,864 filed on Oct. 12, 1970, now U.S. Pat. No. 3,756,788, dated Sept. 4, 1973.

This invention relates to laminated magnetic materials and more particularly to a method for making such materials so that the resulting structure has qualities that are particularly suited for use in connection with alternating current applications such as transformer cores, magnetic recording heads, and shields for electric and magnetic fields.

High permeability soft magnetic materials are frequently used for transformer cores, and magnetic heads or the like. In such cases, the high permeability soft magnetic laminates are held together with electrically insulating organic compounds in order to reduce eddy current losses; and it is an object of this invention to provide both an improved structure of this type and a method for making the improved laminate.

In accordance with present methods of manufacturing high permeability laminates, individual layers of soft magnetic material are first heat treated at around 1000° C in order to impart the desired qualities of high permeability. The thusly heat treated soft magnetic layers are then bonded together with the organic insulating compounds by a hand process. The heat treating, however, leaves the magnetic layers physically soft so that they have a tendency to bend during the bonding step; and this bending causes both non-uniformity and deterioration of the magnetic qualities of both the individual soft magnetic layers and, the resulting structure.

In addition, in order for the laminated product to have acceptable moderate and high-frequency performance characteristics, the layers of magnetic material are preferably quite thin. That is, on the order of about 0.001 inches. Consequently, the soft magnetic layers are usually derived from thinly rolled stock which has an inherent set or curvature resulting from the rolling operation. When the magnetic layers are laminated, therefore, they are flattened out and in so doing additional stresses are created which result in a further deterioration of the uniformity and quality of the structure's magnetic properties. Moreover, the bonding process itself causes certain additional stresses; and frequently laminated cores are "spongy" as a result of a bubble or bonding defect in the organic binder. It is therefore another object of this invention, to provide a laminated magnetic material that is of uniform permeability and coercivity; and substantially free of the above described stresses and defects so as to result in a product having vastly superior and uniform magnetic qualities.

During the above described hand bonding step the soft magnetic layers are frequently so severely bent that the resulting laminate is entirely unsatisfactory for its intended purpose. If such bending is detected during fabrication, the individual laminae can be discarded. This is somewhat costly; but not as serious as when the bend layer is only detected after fabrication in which event it is necessary to discard the entire finished assembly containing the laminated structure. Moreover, only a relatively small amount of bending is required before a laminated device must be discarded. This, therefore, results in a very high scrap-loss rate in the industry. Consequently, it is another object of this invention to provide a method of fabricating uniform laminated magnetic materials which eliminates both the hand bonding steps and the high scrap-loss rates.

Because of the above-described difficulties in handling the thin layers of magnetic material, it is not practical to use layers that are thinner than about 0.001 inches. This however, puts a severe limitation on the frequency ranges with which such structures can perform satisfactorily. Hence, it is another object of this invention to provide a laminated magnetic material having far thinner soft magnetic layers and a method of manufacturing such structures wherein the problems of handling such thin layers are eliminated. An attendant object, of course, is to provide a laminated structure such as a recording head havig superior high frequency performance characteristics.

Another object is to provide a laminated magnetic material that can be used as a shield for electrical and magnetic fields.

It is frequently desired that two or more recording heads be "matched". In this regard, a pair of heads might well have high quality performance, but still be unsatisfactory for a given application because of certain differences in their performance characteristics. Because of the uniformity of the structures fabricated in accordance with the principles of this invention it is relatively simple to provide elements that are both matched and admirably suited for high performance applications.

Another advantage of the invention results from the insulating layers having a much greater hardness than the magnetic layers so that the laminate has vastly improved wear characteristics —— particularly when used in magnetic head applications. In fact, in some instances where it is not necessary to improve a given structure's high frequency response characteristics, it is more important to obtain increased wear qualities, particularly where the manufacture of such a structure results in lower costs, more uniformity, and lower scrap-loss rates. Hence, it is another object of this invention to provide magnetic laminates which both maintain the high frequency response characteristics of currently available devices and provide better wear characteristics.

It is still another object of this invention to provide a laminate which incorporates any of the above described objectives and advantages without requiring either a coreduction step, a vapor deposition step, or an electroplating step.

SUMMARY OF THE INVENTION

In accordance with the principles of this invention a laminate is formed wherein layers of soft magnetic metal are separated by a layer of insulating material whose electrical resistivity is substantially higher than that of the soft magnetic metal and wherein the laminate can be heated to the annealing point of the soft magnetic metal after the laminate is formed, thus imparting to the soft magnetic metal the optimum permeability in the finished product.

In one embodiment of the invention an extrusion billet is fabricated from layers of soft magnetic material each separated by one or more layers of an insulative compounding material. That is a material which can be reacted with its adjacent layer to form one or more intermetallic electrically insulating compounds. The billet materials are then coreduced to a desired thickness and heat treated to form intermetallic insulating layers and impart the desired magnetic properties to the soft magnetic material.

In accordance with other principles of this aspect of the invention the articles into which the laminated structure is to be fabricated are shaped, such as by a blanking operation, prior to the heat treating step. In this manner, the heat treating step removes the stresses developed during the shaping of the laminate into the configuration of its ultimate product.

In accordance with a still further principle of this aspect of the invention the time and temperature of the heat treatment are selected so that a small amount of the material between the soft magnetic layers is permitted to diffuse into the soft magnetic material itself. In some applications this has been found to increase the resulting structure's frequency characteristics.

Also, where it is desired to form a section to shield or concentrate electric fields one or more layers of highly conductive shielding material such as copper are placed between adjacent magnetic layers. This is particularly useful, for example, in a multi-track tape head embodiment where adjacent head sections are separated from each other by the electric field shielding section. In this manner the magnetic layers shield magnetic fields and the conductive layers shield electric fields to result in an easily fabricated composite structure which shields both magnetic and electric fields and prevents "cross talk" between adjacent head sections. Alternatively, laminated shielding sections can be made separately and used in a host of applications for shields as such, and quite aside from their use in combination with recording heads or other transformer-type embodiments.

It will be appreciated from the foregoing summary of this aspect of the invention that it provides a simple method of forming a high quality laminate without the previously required hand operations which are both costly and decidedly detrimental to the uniformity and overall performance of the resulting product. Moreover, in transformer-type applications the ultimate product's frequency-response characteristics are easily controlled by among other things varying the thickness ratio between the magnetic material and the insulatig material; and the amount of coreduction to which the billet is subject.

In some instances it is desirable to avoid the coreduction step described above. Hence, in accordance with other principles of the invention, the layers of soft magnetic metal are separated by one or more layers of elements which, when heated form a highly resistive layer having a resistivity of more than about $10^-$ ohm-cm. For example, a group V element such as arsenic or antimony is plated onto a foil of a group III metal such as aluminum and placed between layers of soft magnetic metal. The resulting laminate is then subjected to heat and pressure to fully react the materials to form highly resistive layers such as a hard semiconductor layer between the layers of soft magnetic metal. Be eliminating the former organic binders, this embodiment still permits the soft magnetic metal to be annealed to recover its high permeability, even though the permeability is not further increased by an additional reduction in thickness. This embodiment, therefore, results in a structure having a uniformly high permeability and good wear characteristics without obtaining the greatly improved high frequency response resulting from the very thin soft magnetic metal layers that are obtained using the coreduction embodiment.

A variation of the embodiment just described is obtained by merely depositing a semiconductor such as selenium, or a simple insulator such as silicon monoxide, onto the layers of soft magnetic metal prior to their being stacked into a laminate. The structure is then merely heated under pressure to obtain bonding of the laminate which displays both high permeability and good wear characteristics.

Both of the immediately preceding embodiments include the step of plating or otherwise depositing onto either the soft magnetic metal or a separate metal foil, elements that combine to form a continuous layer with a resistivity greater than about $10^-$ ohm-cm. In accordance with other principles of the invention, even those steps can be eliminated where layers of glass are substituted for the layers of insulative compounding material separating the layers of soft magnetic metal. It is merely necessary that the glass layers have a coefficient of thermal expansion that is similar to that of the soft magnetic material to prevent thermal stresses from lowering the permeability on cooling from the annealing temperature of the glass. When this method is used, not only can coreduction be eliminated, but no costly vapor-deposition or electro-deposition steps are required; and, if increased wear is the main desired feature of the structure, it is not even necessary to heat the resulting laminate to the annealing temperature of the soft magnetic metal, because adequate bonding can be obtained between the glass and the soft magnetic metal by merely heating the laminate above the softening point of the glass.

Gaseous elements can also be included within the laminate. For example, if it is desired to further improve the hardness of the insulating layer, the entire method can be carried out in one of the manners described above and then gas is diffused into the high resistance layer by heating the laminate in a gas rich atmosphere. In fact, the resulting structure can even be ground and polished before the gas diffusion step.

BRIEF DESCRIPTION OF THE DRAWINGS

The foregoing and other objects, features, and advantages of this invention will be apparent from the more particular description of preferred embodiments thereof as illustrated in the accompanying drawings wherein the same reference numerals refer to the same elements throughout the various views. The drawings are not necessarily intended to be to scale, but rather are presented so as to illustrate the principles of the invention in a clear form.

In the drawings.

DETAILED DESCRIPTION

Figures 1, 2, 3, 6, 7:
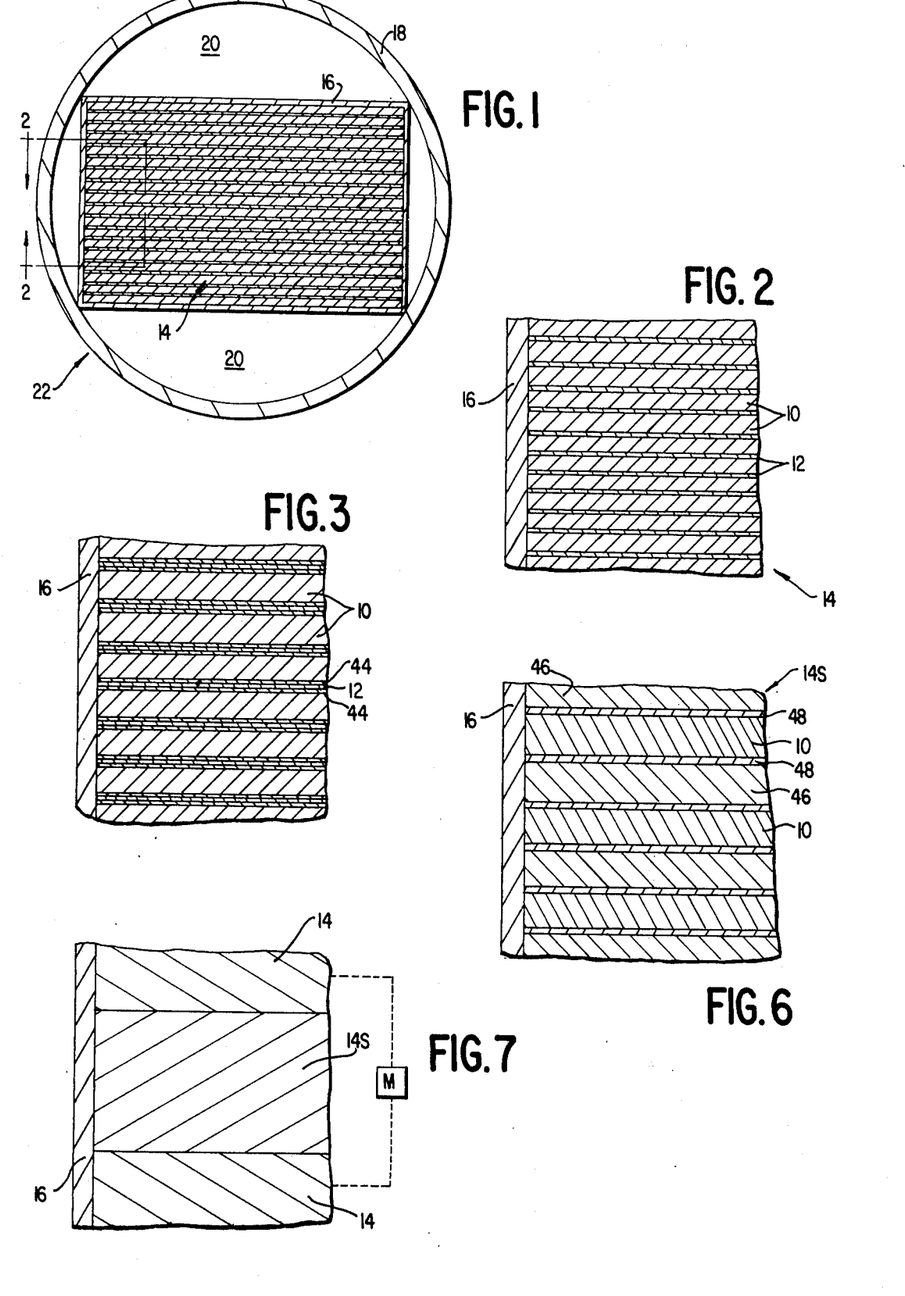
FIG. 1 is a schematic of the cross section of a laminated billet prior to coreduction.
FIG. 2 is an enlarged fragmentary view of FIG. 1 taken along lines 2—2 thereof.
FIG. 3 is a schematic of an alternate embodiment of the structure illustrated in FIG. 2.
FIG. 6 is a schematic cross-sectional view of a shielding laminate fabricated in accordance with principles of the invention.
FIG. 7 is a schematic cross sectional view of a composite structure comprised of both a FIG. 2 or 3-type laminate and a FIG. 6-type laminate.

A first aspect of the invention is illustrated in FIG. 2 wherein layers of soft magnetic material 10 are separated by layers 12 of a suitable insulating compounding material which, when heated reacts with the soft magnetic material to form an electrically insulative compound of elements that are covalently bonded in stoichiometric proportions otherwise referred to as an electrically insulative intermetallic compound. A desired number of these various layers 10 and 12 are made into a sandwich 14 and placed in an etch resistant casing 16 as illustrated in FIG. 1.

The casing 16 and its enclosed sandwich 14 are then placed in an extrusion can 18 and a filler material 20 having mechanical properties similar to that of the magnetic material is placed between the sides of the can 18 and the casing 16. End caps (not shown) are then welded onto the can to close its ends; and, in this regard, one of the caps includes an evacuation tube so that the can can be evacuated after the end caps are welded in place. Once the can is thusly evacuated the tube is "pinched-off" and welded closed to retain a vacuum inside can 18.

The resulting structure 22 of FIG. 1 is then suitably heated and extruded through a laminar-flow die so that the layers 10 and 12 are coreduced and diffusion bonded.

After extrusion the can 18 and filler sections 20 are removed from the billet such as by etching while the etch resistant casing 16 protects the coreduced sandwich 14.

Figure 4:
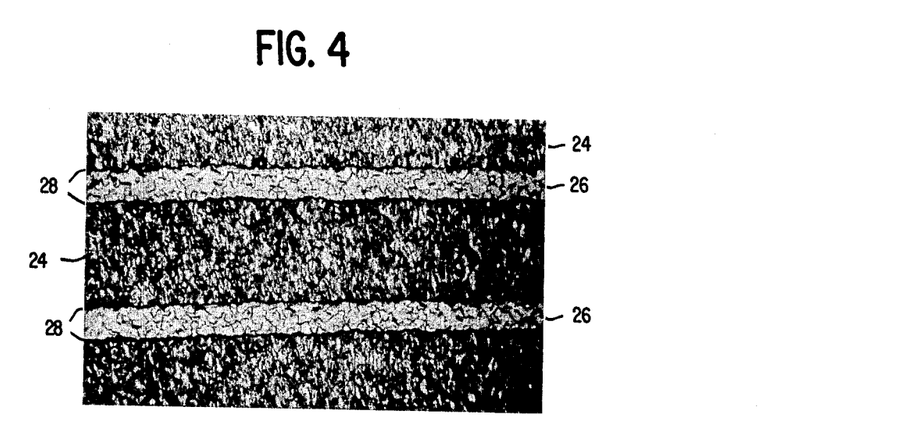
FIG. 4 is a photomicrograph of structure similar to that of FIG. 2 after it has been coreduced.

FIG. 4 is a photomicrograph of the laminated portion of an actually extruded billet to be described in more detail shortly. Briefly, however, FIG. 4 is a 1350X magnification of an extruded laminate comprised of layers of soft magnetic material 24 that have been coreduced with intervening layers 26 of a material with which the magnetic layers 24 will form intermetallic compounds during a heat treating step to be described shortly. It should be noted, however, that the layers 24 and 26 are diffusion bonded as indicated by the dark lines 28.

Preferably, the FIG. 4 laminate is next shaped into its ultimate product form. For example, toroids having square cross sections are machined or blanked out of the extruded flat stock. The shaped pieces are then deburred and etched to remove metal which might be smeared across the edges of the laminations.

Figure 5:
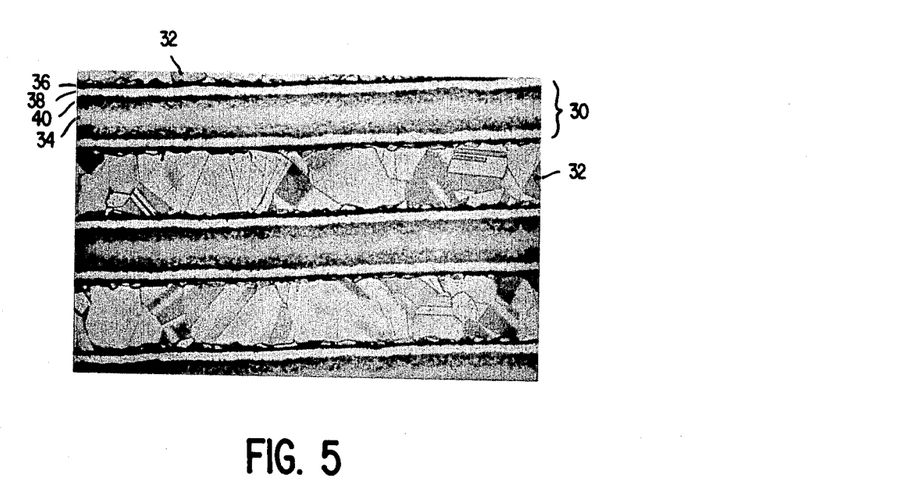
FIG. 5 is a photomicrograph of the FIG. 4 structure after it has been heat treated.

The extruded stock or shaped elements, as the case may be, are next heat treated in a generally conventional manner to anneal the magnetic material and impart to it the desired high permeability and low coercive force qualities. Heat treatment of magnetic material to improve its qualities is already discussed in the literature. Hence, it will not be discussed in detail herein. It should be carefully noted, however, that during the heat treating step in this invention the diffusion couple illustrated by the lines 28 in FIG. 4 give rise to the formation of intermetallic compounds such as those within bracket 30 in FIG. 5. In this regard, the magnetic material 24 in FIG. 4 is annealed to form the large grained bands 32 in FIG. 5; and the layers 26 in FIG. 4 are located in the center 34 of the bracketed layers 30 in FIG. 5. The remaining layers such as 36, 38 and 40 in FIG. 5 are first, second and third intermetallic compounds of the soft magnetic material and the insulating compounding material.

It is an important aspect of this portion of the invention that the layers between the magnetic materials form insulative intermetallic compounds wherein elements unite in definite atomic proportions similar to true chemical compounds, but do not follow simple valence rules. In this connection it is preferred that the laminations 12 in FIG. 2 be comprised of a refractory metal such as niobium, tantalum, zirconium, titanium, hafnium, or vanadium. The selection of such laminae in any given instance, however, depends upon the type of magnetic material used; and whether the sandwich 14 includes additional layers as will be described shortly in connection with the FIG. 3 embodiment. That is, depending upon the other materials in the sandwich, the layers 10 and 12 are selected to provide at least one layer of an insulative intermetallic compound during the heat treating step.

The above described refractory metals are preferred because of their high melting point and good formability but primarily because they form many intermetallic compounds both between themselves and with iron and nickel in the adjacent layers of soft magnetic material. Other metals such as magnesium, aluminum, zinc, and cadmium are also suitable because they too form insulative intermetallic compounds, albeit fewer in number. Certain rare earths are also suitable. In this regard, phase diagrams showing intermetallic compounds within binary systems are shown in *Constitution of Binary Alloys* by Max Hansen, 2nd Edition, published by McGraw-Hill Book Co., N.Y., 1958; and, *Constitution of Binary Alloys*, First supplement; by Rodney P. Elliot, McGraw-Hill Book Co., N.Y., 1965. Of course intermetallic compounds are also formed in ternary and quaternary alloys. But such formations are complex and will not be discussed further except to note that binary phase diagrams provide strong guidelines as to what can be expected from the more complex alloys; and refer to a discussion of intermetallic compounds and their properties in *Intermetallic Compounds*, J. H. Westbrook, Wiley & Sons, N.Y.

The FIG. 3 embodiment is otherwise similar to that described above except that additional layers 44 are placed between the layers of a refractory metal 12 and the layers of magnetic material 10. In this regard, the material for the layers 44 is selected so as to form an intermetallic compound with the material of layer 12, but not harm the conventional magnetic qualities of the material 10. Again, although specific metals will be noted shortly, the above noted properties of many suitable metals and alloys are available in the literature and will not be discussed in detail herein.

In one specific embodiment of the invention the soft magnetic material 10 was comprised of "Hy Mu 800", a trademarked product of the Carpenter Steel Corporation containing 79% nickel, 16% iron, and 4% molybdenum. This alloy is a single phase, or solid solution alloy, with the crystal structure of nickel; and, when properly heat treated, exhibits high permeabilities and low coercive forces. Each layer 10 was 0.007 inches thick, about 2 inches wide, and about 5 inches long.

The particular embodiment's layers 12 were of commercial grade zirconium about 0.0007 inches thick. In this regard, the relative thicknesses of the layers 10 and 12 are selected to obtain a high quantity of magnetic material while still having enough of the compounding metal to obtain good electrical insulating characteristics over the desired frequency range of operation for the ultimate product. Thickness ratios of 10 to 1 thru 20 to 1 are preferred. The ratio can go to 50 to 1, but fabrication becomes more costly because of the extensive coreduction required. Ratios of as little as 3 to 1 also provide better gain than currently available products, but the gain at these relatively low ratios is considerably less than the gain of structures having thickness ratios within the preferred range. Moreover, when low thickness ratios are used, the annealed product tends to include a relatively thick layer of insulating compounding material corresponding to layer 34 in FIG. 5. Where space is a consideration, however, it is preferable that all or most of the insulating compound material be reacted to form insulating intermetallic compounds; in which event there is little or no layer corresponding to layer 34 in FIG. 5.

The above described Hy Mu 800/zirconium sandwich 14 was surrounded by a layer of titanium which served as the etch resistant barrier 16. The sandwich and barrier were then placed in a low carbon steel can 18 and a low carbon steel filler metal 20 was employed because of the similarity between its metalurgical characteristics and those of the Hy Mu 800. Another example of a suitable filler metal would be a copper-nickel alloy because it too has metalurgical characteristics similar to those of Hy Mu 800. Of course, other types of filler metals might be used where other types of magnetic metals are employed; and in this respect it should be noted that any soft magnetic material may be used. Other examples of suitable soft magnetic materials can be found in *Ferromagnetism* by Richard M. Bozorth, published by Van Nostrand, New York, 1951; and *Metals Handbook* by Metals Handbook Committee of ASM, published by ASM, 1961, pages 785–797.

After the assembly 22 was evacuated it was heated to 700° C and extruded through a ½ inch laminar flow die where the layers were coreduced and diffusion bonded. The extruded billet was then sprayed with a ferric chloride etching solution to remove the low carbon steel can and filler sections. In this regard, the titanium was selected because it is not attacked by the ferric chloride so that both the titanium and the sandwich were left intact. Hence, the result of the etching step was a rectangular array having the cross section of that depicted in the FIG. 4 photomicrograph. The sandwich was then further reduced by rolling to 0.020 inch.

Toroids having a square cross section were then machined out of the extruded flat stock; and the toroids were deburred and etched in a hydroflouric acid-nitric acid solution to remove metal that had smeared across the edges of the lamination.

Next some of the toroids were heat treated at 900° C for 2 hours and permitted to cool while they remained in the heating furnace. This resulted in the magnetic layers 32 being in their fully annealed state as indicated by the large grain size and the "thermal twins" (widebands in the grains) in FIG. 5. Although not fully illustrated in the 1350X FIG. 5 photomicrograph the interdiffusion between the layers of zirconium and Hy Mu 800 resulted in the formation of substantially all of the possible intermetallic compounds that might be predicted from the Ni-Zr phase diagram. The layer 40 in FIG. 5 however, is probably the first electrically insultative intermetallic compound of zirconium and Hy Mu 800 and, therefore, highly resistive compared to Hy Mu 800.

As noted, some of the toroids that were machined from the extruded flat stock were withheld from heat treatment. Both these and the annealed toroids were then wound into a transformer configuration and compared with a similar structure made in accordance with conventional techniques. In this regard, a known alternating current was applied at given frequencies to the primary of each transformer; and the voltage outputs from the secondaries of the transformers were measured by a high impedance voltmeter (10 megohms). Particularly at high frequencies to be discussed shortly, the EMF across the secondary of the transformer having the annealed toroids of the invention was much higher for the same drive current than the EMF developed across the unannealed toroids. In addition, the transformers having the annealed toroids of the invention exhibited sharp resonant frequencies resulting from the increased capacitive effect of the intermetallic insulative layers which were thus proven to have been obtained during the heat treatment.

More significantly, the transformers comprised of the invention's annealed structure were several orders of magnitude better than the conventionally structured transformers. That is, the structure of the invention had a better response at a frequency of 10 megahertz than the conventional transformer type core exhibited at 60 kilohertz. Moreover, the structure of the invention has an excellent constancy of response while the conventionally structured transformer's was down by a factor of five when its input frequency reached 10 kilohertz.

In two other more particular embodiments of the invention the sandwich 14 was structured in accordance with FIG. 3. In one, 0.007 inch thick layers 10 of Hy Mu 800 were separated by a composite layer comprised of a 0.0007 inch thick layer of titanium (12 in FIG. 3) between adjacent layers 44 of oxygen free high conductivity copper (OFHC) having about the same thickness as the titanium. Copper was selected because it was not known to have any harmful effects upon the magnetic properties of the Hy Mu 800 when diffused into it; and it was also known that copper would form a intermetallic insulative compound with titanium. In the other embodiment cadmium was substituted for the titanium layer 12. The remainder of the method of fabrication was the same as that described above; and the test results were equally satisfactory. Hence, it is not necessary that the intermetallic compound be formed with the magnetic material itself. Moreover, it has been found that the resulting structure's frequency response improves when there is diffusion of an intermediate metal such as copper into the magnetic metal. After a point, of course, extensive such diffusion would indeed harm the magnetic qualities of the magnetic material itself, but up to that point it has been found helpful to encourage such diffusion. In the Hy Mu 800/copper-titanium embodiment, for example, it was found that up to 6% of the copper could be satisfactorily diffused into the Hy Mu 800.

Preferably the intermediate layer of copper 44 in FIG. 3 should not be much, if any, thicker than the layer of insulative compounding material. In fact, for transformer-type applications it is preferred that the intermediate layer of highly conductive metal be sufficiently thin that it is substantially completely reacted during the annealing step to form intermetallic compounds in place of the original intermediate layer. This is not to say that the resulting transformer-type embodiments cannot retain an unreacted layer of the intermediate metal, but eddy current losses increase as the thickness of such a layer increases; and the advantages of the intermediate layer are dissipated as its thickness approaches that of the soft magnetic material. Still other embodiments were substantially the same as those just described except that the copper was replaced by nickel and the results were about the same.

Another embodiment of the invention is schematically illustrated in connection with the shield structure of FIG. 6. Therein a shield sandwich 14S is comprised of layers of copper 46 that were relatively thick as compared with intermediate layers 44 in the FIG. 3 embodiment. These layers 46 were placed between adjacent layers 48 of titanium and soft magnetic material 10. In this regard, both the copper and magnetic material layers were 0.007 inch thick and the titanium was 0.0007 inch thick. The embodiment was otherwise fabricated in the same manner described above. In this case, however, the titanium layers 48 formed insulative intermetallic compounds with both the soft magnetic material 10 and the thick copper layers 46. These intermetallic compounds were similar to layers 36, 38, and 40 in FIG. 5; and the resulting copper layers were sufficiently thick to act as an electric field shield. Hence, after the billet was coreduced and blanked the copper layers 46 served as electric field shields and the magnetic layers 10 (corresponding to layers 32 in FIG. 5) served as magnetic field shields.

Inasmuch as the highly conductive layer 46 is used as an electrical field shield it must not be so thin that it is all reacted during the annealing step. In fact it should be at least three times as thick as the layers 48 of insulative compounding material; and it is preferred that the layers 46 be sufficiently thick that there be about the same thickness remaining after the intermetallic compound reaction as there is remaining in the layers of soft magnetic material. But insofar as shield performance is concerned, and commensurate with space limitations, the highly conductive layer can be much thicker if desired. In some shielding applications it is not necessary to insulate the conductive layers 46 from the soft magnetic layers 10. Hence, in those cases layer 48 may be omitted.

One application of the above described shielding embodiment is to simultaneously form such a structure in combination with the transformer-type structure of FIGS. 2 and 3. That is, as illustrated in FIG. 7 the extrusion billet is comprised of a first sandwich of layers 14 such as those illustrated in FIG. 2 and a second sandwich 14S of shielding layers such as those illustrated in FIG. 6. After coreduction and shaping the transformer-type sections resulting from sandwiches 14 are connected into a driven or receiving magnetic circuit M, but the shielding sections resulting from sandwich 14S are not. In this manner, the shielding sections shield the transformer-type sections from each other so that the composite structure of FIG. 7 is admirably suited for use in multi-track recording heads wherein each of the transformer-type sections serves its own track and its adjacent shield section prevents it from receiving "cross talk" from the other transformer-type sections. In the above regard, it should be appreciated by those skilled in the art that the circuit M is intended to be broadly illustrative. For example, the dotted lines do not indicate that the sections 14 are connected together and the circuit "m" can certainly include electric circuit portions.

It will be apparent that the above described method is far more satisfactory than conventional techniques; and, because hand bonding is not required the scrap-loss rate is relatively negligible. Of course, the increase in frequency response in structures made in accordance with this aspect of the invention is dramatic. Moreover, because of the uniformity between the various elements fabricated from a given piece of extruded flat stock, all of the elements fabricated from the piece are "matched". Hence, the expense and difficulty of obtaining matched elements has been eliminated. Also, because the intermetallic compounds are quite hard the resulting laminate is highly resistant to wear which is a significant advantage — particularly in magnetic recording head applications.

While this aspect of the invention has been particularly shown and described with reference to preferred embodiments thereof, it will be understood by those skilled in the art that various changes in form and detail may be made therein without departing from the spirit and scope of the invention. For example, layers of additional materials can be used between the layers of soft magnetic material; and although an initial diffusion bonding step has been described in connection with an extrusion die, similar bonding can be obtained by rolling or pressing. In addition, the insulative compounding materials can include gaseous elements; and they can be electoplated, vapor deposited, or otherwise placed on the soft magnetic material instead of being placed in the sandwich by hand. Also, other techniques can be used to separate the coreduced layers from the extrusion can; and additional layers can be added to the billet sandwich. Similarly, although dimensions of the sandwich elements have been specified above they are not as significant as their ratios. The final thicknesses of the various layers are more important to frequency response and these can be controlled by the amount of coreduction to give magnetic layers as thin as 0.0001 inch.

As noted above, coreduction can be eliminated by using some other highly resistive material instead of materials that react to form intermetallic compounds. In this respect, in one embodiment arsenic was deposited to a thickness of about 0.0005 inch on an aluminum foil 0.0007 inch thick. A laminate similar to that of FIG. 2 was then formed of a soft magnetic metal ("Hy Mu 800") and the arsenic coated foil. Next, the stack was subjected to pressure and heated to the annealing temperature of the soft magnetic metal. As this occurred the arsenic and aluminum reacted to form a semi-conductor or an essentially electrically insulating layer between each layer of soft magnetic metal. The resulting laminate was then ground and polished before testing.

In another aluminum foil embodiment, a 0.00063 inch layer of antimony was deposited on 0.0007 inch aluminum foil which was then laminated with soft magnetic metal. This laminate was then heated to the annealing temperature of the soft magnetic metal. As this occurred, diffusion bonding took place between the antimony and the soft magnetic metal; and the aluminum reacted with the antimony to form a semiconductor or an essentially electrically insulating layer. The diffusion bonded portion was probably not insulative in nature, but the resulting semiconductor layer was sufficiently electrically insulative that the resulting laminate had excellent overall properties for use in magnetic heads, for example.

Inasmuch as the layers of soft magnetic metal (about 0.001 inch thick) were not further reduced in thickness, the resulting structure's high frequency response was not increased as dramatically as in the coreduced embodiment described above. There was some increase in the high frequency response characteristics with respect to conventional laminates of similar thickness, however, because the soft magnetic metal was annealed after lamination to remove the fabrication stresses which would not have been removed during construction of a conventional laminate. In addition, the scrap-loss rate in the conventional laminate is much larger; the laminates according to this aspect of the invention are much more uniform; and the laminate of the invention has vastly greater resistance to wear because of the hardness of the highly resistive layers.

In other embodiments of this aspect of the invention the highly resistive materials as such are deposited directly onto the soft magnetic metal layers so that there is no need to react two layers to form a highly resistive layer. Selenium, for example, is vapor deposited on a soft magnetic metal and stacked to form a laminate in the manner described above in order to obtain a laminate having characteristics similar to those described for the arsenic-aluminum embodiment. Silicon monoxide is also used to obtain similar results. In fact, if high frequency response characteristics are not of sufficient importance to the particular product in which the laminate is placed, it is not even necessary to heat the composite laminate to the annealing temperature of the soft magnetic metal. It is only necessary to heat the structure to provide adequate bonding to obtain the desired high wear resistance that is afforded by the hardness of the semiconductor or other highly resistive layer.

Additional semiconductors or other highly resistive combinations of elements can also be used. For example, the layer between the soft magnetic metal in FIG. 2 can be comprised of selenium deposited on lead, tin, or hafnium. Other examples are cadmium sulfide, lead sulfide, cadmium oxide, zinc sulfide, zinc oxide, nickel oxide, germanium sulfide, tin sulfide; and other compounds having similar energy gaps such as those set forth in the *Handbook of Chemistry and Physics* published by the Chemical Rubber Company, Cleveland, Ohio. In the 1972–1973 Edition (53rd) such semiconductor elements are listed at pages E-89 through E-92.

The semiconductor embodiments require some type of deposition such as plating, vapor depositing, or the like. The aspect of the invention about to be described, however, even eliminates such deposition steps. In this regard, it has previously been suggested that layers of similar materials be sintered or otherwise bonded together to form magnetic laminates. U.S. Pat. No. 3,478,340 to Schwartz describes such a method. In those cases, however, extremely highly resistive ceramic type powdered ferrites are bonded with powdered ceramics per se to form high coercivity laminates having wide hysteresis loops. That is, Schwartz uses ferrites having resistivities in the range of $10^2$ to $10^{11}$ ohm-cm as compared with $10^{-5}$ or so ohm-cm for the soft magnetic metals of the instant invention.

One of the objects of the instant invention, has been to bond dissimilar materials such as low-resistivity, soft magnetic metal having low coercivity and narrow hysteresis loops with relatively electrically insulative material in a manner so that the soft magnetic metal layers can be annealed after fabrication without destroying the bond therebetween. Previously soft magnetic metal layers were bonded by organic binders such as epoxy which, even at moderately elevated temperatures, breakdown causing the laminate to come apart.

Provided certain requirements are met, it has been found that the above objectives can even be obtained by laminating glass with soft magnetic metal and heating them to form a bond therebetween. Basically, it is merely necessary to ensure that, after annealing, the soft magnetic metal maintains its high permeability and the layers remain adequately bonded. Hence, the glass and the soft magnetic metal are selected so that their coefficiently of thermal expansion are similar throughout the temperature range from the strain point of the glass to the temperature at which the resulting structure is to be used.

In the above regard, glass has virtually no crystal structure, but it nevertheless has several significant temperature points that are defined by using the viscosity of the glass as a reference. Fluid glass is said to be above its "working temperature". Somewhat below this in temperature is the "softening point" and below that the "annealing point". The "strain point" or "setpoint" of the glass is at a still lower temperature. Below the strain point, glass can no longer compensate for strain so that stresses can be introduced into the glass. Such stresses can be removed, however, by heating the glass to its annealing temperature. No stresses can be introduced above the strain point. Hence, the temperature range over which the coefficients of expansion between the soft magnetic material and the glass must be compatible, extends from the strain point of a given glass to room temperature (or the temperature at which the resulting structure is to be operated).

In one embodiment of this aspect of the invention the soft magnetic metal was Hy Mu 800; and the glass was that identified in the *Kirk-Othmer Encyclopedia of Chemical Technology* (2nd Edition, 1965) as "Corning 1990". This particular glass had a softening point of 500° C; an annealing point of 370° C; a strain point of 340° C: and was comprised of 41% silicon dioxide, 40% lead oxide, 12% potassium oxide, 5% sodium oxide, and 2% lithium oxide.

Figure 8:
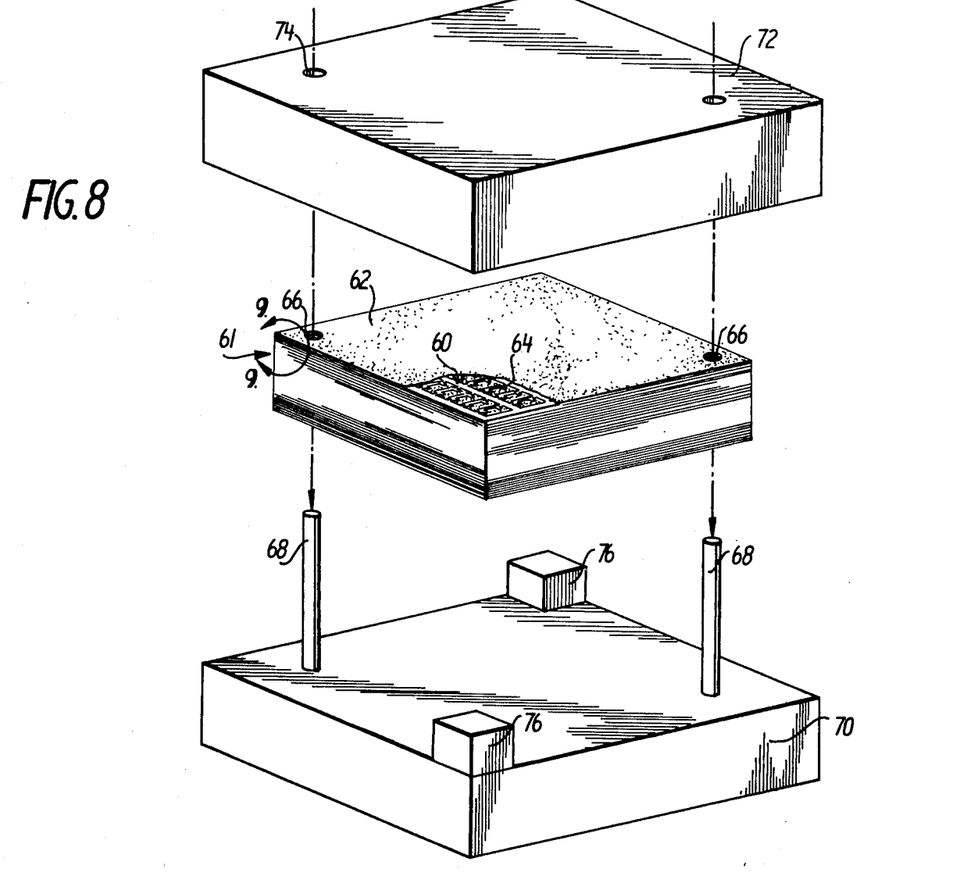
FIG. 8 is an exploded schematic view illustrating the fabrication of one of the embodiments of the invention.

With reference to FIG. 8, layers of frets 60 are alternated with layers of glass 62. In this regard, the frets are conventional sheets of soft magnetic material having elements 64 photoetched therein. The illustrated elements 64 are tape head sections; and the glass is comprised of sheets of powdered glass formed into a tape-like structure by a volatilizable organic binder such as that described in U.S. Pat. No. 3,371,001.

Figure 9:
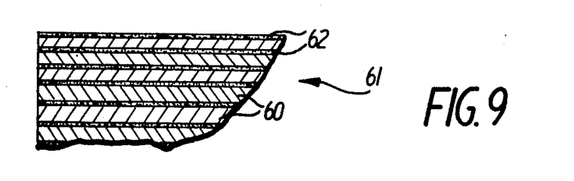
FIG. 9 is a fragmentary sectional view taken along lines 9—9 in FIG. 8.

The soft magnetic frets are about 0.001 inch thick. After they are cleaned they are located by holes 66 over locating pins 68 extending upwardly from a platen 70. The alternate layers of glass are about 0.0002 inch thick to form a laminate such as that shown in FIG. 9 wherein the layers 60 correspond to layers 10 in FIG. 2 and the layers 62 correspond to layers 12 in FIG. 2.

The platen assembly is then placed in a furnace and heated in an oxygen containing atmosphere. The organic binder voltailizes without leaving an undesirable residue. The glass is then heated sufficiently that it bonds the layers of soft magnetic metal. That is, the glass is heated to at least its softening point which, in this case, is 500° C.

A weight 72 is then located by means of holes 74 on pins 68 above both the bonded laminate 61 and thickness-control blocks 76. The entire structure is then placed in an evacuated retort or other oxygen-free encapsulation to prevent oxidation during a subsequent heating step to anneal the soft magnetic metal (about 600° C to 1200° C in the case of Hy Mu 800). In this manner, the weight 72 compresses the laminate to its desired thickness as determined by the height of the gauge blocks 76 and the soft magnetic metal is fully annealed so that its fabrication stresses are removed.

The annealed laminate is then subjected to a conventional cooling cycle for the particular soft magnetic metal that is employed. For Hy Mu 800, for example, a cooling rate of about 195° C - 280° C per hour is employed from the metal's annealing temperature, through its Curie temperature (about 460° C for Hy Mu 800), to a temperature somewhat below the Curie temperature (370° C in this case). In order to prevent stresses that can occur from thermal gradients, the laminate was cooled from 370° C to 40° C at 100° C/hr and then removed from the furnace.

Finally, the fully annealed laminate is cut into desired shapes, ground, and polished in a conventional manner.

The permeabilities of laminates constructed in the manner just described were excellent; and compared with commercial organically bonded laminates having soft magnetic metal layers of the same thickness (0.001 in.) are as follows:

| Gauss | Frequency (Hertz) | Permeability of Structure of Invention | Permeability of Commercial Structure |
|---|---|---|---|
| 40 | 1,000 | 13,000 | 11,000 |
| 40 | 50,000 | 8,800 | 7,200 |
| 2,000 | 1,000 | 35,000 | 35,000 |
| 2,000 | 50,000 | 10,000 | 9,400 |

Hence, it is apparent that the method of the invention results in a generally improved permeability; and, in addition, results in a structure having vastly superior wear characteristics; a lower strap loss rate; and more uniformity. Perhaps most significantly, however, because commercial laminates having organic binders cannot be annealed after fabrication, they cannot be satisfactorily laminated with ultra thin foils of soft magnetic metal. 0.001 inch foils are presently a practical minimum. With the instant invention, on the other hand, beginning foils can be an order of magnitude thinner because the resulting fabrication stresses can be removed during the annealing step after basic fabrication. When these ultra thin foils are employed with the method of the invention, the resulting laminate's high frequency response characteristics increase by a factor that is roughly inversely proportional to the thickness.

Since presently commercially available organic laminates do not have such thin soft magnetic metal layers, comparative data cannot be provided. It should be abundantly clear, however, that the method of the invention provides not only moderately increased permeability and greatly increased wear for laminates having standard thicknesses of soft magnetic material, but the high frequency permeability increases dramatically as the thickness of the soft magnetic material is decreased in the manner permitted by the method of the instnt invention.

Other glasses can be combined with other soft magnetic metals to achieve results similar to those described above so long as the metal and the glass have generally similar coefficients of thermal expansion. In the above example, for instance, the coefficients of expansion for both the 1990 glass and the Hy Mu 800 were virtually the same at both room temperature and the strain point (sometimes called set point) of the glass. In this respect, the mean thermal expansion coefficient from 25° C thru 300° C for the 1990 glass was about $137 \times 10^-$ inches per inch per ° C; while that of the Hy Mu 800 was about $136 \times 10^-$ inches per inch per degree C. The change in length per unit length of the glass between 25° C and its strain point (340° C) was $433 \times 10^{-5}$; while for the Hy Mu 800 over this temperature range it was $430 \times 10^{-5}$; and the maximum difference between the two was about $90 \times 10^{-6}$ inches per inch occurring at about 200° C. In this regard, it presently appears that although expansion differences greater than 500 parts per million can be tolerated under some conditions; differences of 100 parts per million cause relatively little trouble. Hence, for purposes of this invention thermal expansion coefficients can be considered as being substantially the same even if expansion differences between operating temperature and the strain point are 500 parts per million.

Many, many other combinations of glasses and soft magnetic metals are equally satisfactory. For example, Hy Mu 800 can be used with Corning 0110 or 9776. The composition of 0110 is 50% $SiO_2$; 19½% $K_2O$; 6% $Na_2O$; 10% $BaO$; 5½% $Al_2O_3$; 7.2% $CaO$; and 1.8% F. The composition of 9776 is 88% $PbO$ and 12% $B_2O_3$. When using some of the very low softening point glasses, however, it may not be desirable to subsequently heat the laminate to the annealing point of the soft magnetic layers in order to prevent the glass from possible deterioration. Similarly, Corning glass 6810 can be laminated with a soft magnetic metal containing 42% nickel and 58% iron. The glass in this example has a composition of: 56% silicon dioxide; 10% aluminum oxide; 1% boron trioxide; 7% sodium oxide; 1% Potassium oxide; 4% calcium oxide; and 3% lead oxide; and has a mean thermal coefficient of expansion of $69 \times 10^{-7}$ inches per inch per degree C from 0° C through 300° C. The mean thermal coefficient of expansion for the soft magnetic metal, is also about $69 \times 10^{-7}$ inches per inch per degree C from 25° C through 450° C.

Another suitable laminate is comprised of Corning glass 8871 and a soft magnetic metal alloy comprised of 50.5% nickel and 49.5% iron. The glass composition is 42% silicon dioxide; 1% lithium oxide; 2% sodium oxide; 6% potassium oxide; and 49% lead oxide. The mean coefficient of thermal expansion of the glass from 0° C is $102 \times 10^{-7}$ inches per inch per degree C; and the mean coefficient of thermal expansion over the same temperature range for the alloy is $101 \times 10^{-7}$ inches per inch per degree C.

A further listing of thermal coefficients of expansion appears in the above noted Bozorth publication at page 643 et seq. Further listings appear in *Cartech Alloys for Electric, Magnetic, and Electrical Applications*, Carpenter Technology Corp., Reading (1965); and the coefficients of expansion of still further alloys can be obtained from industrial publications such as the *Allegheny Ludlum Blue Sheet Series*, Allegheny Ludlum Steel Corporation, Pittsburgh.

Similarly, coefficients of thermal expansion for various other types of glasses can be obtained from the *Kirk-Othmer Encyclopedia of Chemical Technology*, 2nd Edition, 1965, at page 533 et seq. and particularly page 573. See also the *Handbook of Glass Manufacture*, Ogden Publishing Company, New York, 1961; or the standard catalogs of glass manufacturers such as the Corning Glass Works, Corning, New York; or, Owens-Illinois Glass, Toledo, or the Schott catalog of the Jena Glass Works.

Reference to the above noted works indicates that the coefficients of thermal expansion for many magnetic alloys range from about $12 \times 10^{-7}$ inches per inch per degree C to about $130 \times 10^{-7}$ inches per inch per degree C. Glasses, on the other hand, run from pure quartz (silicon dioxide) having a mean thermal coefficient of expansion of about $5.5 \times 10^{-7}$ inches per inch per degree C through boron Trioxide ($B_2O_3$) having a mean coefficient of thermal expansion of about $150 \times 10^{-7}$ inches per inch per degree C all the way up to sulphur based glasses having coefficients of thermal expansion of high as $800 \times 10^{-7}$ inches per inch per degree C. Hence, a host of various glasses can be combined with standard magnetic alloys in the practice of the instant invention. Moreover, various alloying elements can be added to given standard alloys to adjust their thermal ceofficients of expansion upwardly or downwardly at various temperatures or through various temperature ranges; and, various modifiers can be added to given glasses in order to adjust their thermal expansion coefficients. See, for example, *Kirk-Othmer* at pages 538 and 580 et seq.

It should be noted that the above described semiconductor or other high-resistance-layer embodiments can also employ the tape aspect similar to that described above in connection with FIG. 8. For example, the highly resistive layers can be formed by mixing hafnium or molybdenum powder with selenium powder and a volatile binder to form a tape such as that described in more detail in U.S. Pat. No. 3,293,072. When heated in the manner described above, therefore, the organic binder volatizes; and the selenium reacts with the metal to form the desired highly resistive layer. Alternatively, a similar tape can be comprised of aluminum powder mixed with antimony or arsenic powder so that the resulting resistive layer is a semiconductor.

In the examples just described the resistivity of the molybdenum-selenium compound is about 4000 ohm-cm; and that of the hafnium-selenium compound is about 40,000 ohm-cm.

Various other elements can also be placed in tape form, laminated, and reacted to form the highly resistive inorganic layer. Two metals can be reacted to form an intermetallic compound or semiconductor; a metal such as molybdenum or hafnium can be reacted with a nonmetal such as sulphur to form a highly resistive inorganic layer; the tape can be comprised of a powdered semiconductor such as selenium; or set forth in more detail above the tape can be comprised of an insulator such as glass.

In accordance with still another aspect of the invention the hardness of the various insulating layers can be still further improved by heating the laminate in various gas-rich atmospheres so that the gases diffuse into the insulating layers, or the gases can be incorporated into the insulating layers by other methods.

In a preferred embodiment of this aspect of the invention, the entire method is carried out in one of the manners described above for fabricating a laminate. The laminate is first assembled, blanked, annealed, ground, and polished. It is then heated in a hydrogen-rich atmosphere so that the hydrogen diffuses into the insulating layers to form metal hydrides which are harder than the pre-hydrogen-diffused insulating layers. At the same time the annealing imparts the optimum magnetic properties to the soft magnetic material. Many examples of suitable such metal hydrides can be found in *Metal Hydrides* by Muller, Blackledge and Libowitz, Academic Press, New York, 1968.

Other gases can also be diffused into the metals or otherwise combined therewith to obtain beneficial results. Oxygen and nitrogen, for example, can also be diffused or otherwise combined with the insulating layers, but they are more difficult to diffuse than hydrogen.

From the above description it will be apparent that the invention provides a structure wherein a magnetic laminate not only has increased wear characteristics, but is more reliable and more uniformly structured. Perhaps most importantly, however, the invention provides a soft magnetic laminate that can be annealed after fabrication in order to obtain the most desirable magnetic properties for the soft magnetic metal.

Although the intermetallic compound embodiment has special advantages, the other embodiments do not require extrusion; nor does the glass embodiment require vapor deposition or the like. Hence, it should be apparent that the glass embodiment is well adapted for the small manufacturer to whom extrusion and deposition equipment are not always readily available.

The embodiments of the invention in which an exclusive property or privilege is claimed are defined as follows:

1. A method of making a magnetic laminated material for magnetic tape heads comprising the steps of:
    constructing a high permeability, low coercivity, wear resistant structure comprised of layers of magnetically soft metal separated by at least one layer of an inorganic material having a resistivity of more than $10^{-4}$ ohm-cm which, when heated, will both bond to said magnetically soft metal and result in a substantially continuous inorganic layer whose resistivity is greater than $10^{-4}$ ohm-cm; and
    heating said structure to result in a laminate comprised of layers of substantially stress-free magnetically soft metal separated by and bonded to said inorganic material whose resistivity is more than $10^{-4}$ ohm-cm.

2. The method of claim 1 wherein the inorganic resistive material is a semiconductor material.

3. The method of claim 2 wherein said semiconductor material is selenium.

4. The method of claim 3 wherein said selenium is deposited on a layer of said magnetically soft metal prior to construction of said structure.

5. The method of claim 1 wherein the inorganic resistive material is silicon monoxide.

6. The method of claim 5 wherein said silicon monoxide is deposited on a layer of said magnetically soft metal prior to construction of said structure.

7. The method of claim 1 wherein said structure is heated to at least the annealing temperature of said magnetically soft metal during said heating step.

8. The method of claim 1 wherein said structure includes a Group III metal and a Group V element; and the temperature during said heating step is sufficient to react said Group III metal with said Group V element so that the resulting highly resistive inorganic layer is a semiconductor.

9. The method of claim 8 wherein said Group III metal is aluminum and the Group V element is arsenic so that said semiconductor is aluminum arsenide.

10. The method of claim 9 wherein said aluminum is in the form of a foil and said arsenic is deposited thereon prior to construction of said structure.

11. The method of claim 8 wherein said Group III metal is aluminum and said Group V element is antimony so that said semiconductor is aluminum antimonide.

12. The method of claim 11 wherein said aluminum is in the form of a foil and said antimony is deposited thereon prior to construction of said structure.

13. The method of claim 8 wherein said heating step includes heating to the annealing temperature of said magnetically soft metal.

14. The method of claim 1 wherein the inorganic resistive material is glass.

15. The method of claim 14 including the step of selecting said glass and said magnetically soft metal so that their coefficients of thermal expansion are such that their dimensions at operating temperature differ by no more than about 500 parts per million so that the resulting magnetically soft layers are substantially stress free.

16. The method of claim 15 wherein said selection step is such that the difference between said mean coefficients of thermal expansion is no more than about 500 parts per million at any point within said temperature range.

17. The method of claim 14 wherein said glass is in particulate form suspended in a volatile binder; and
wherein the bound particulate glass is heated to above the volatilization temperature of said binder.

18. The method of claim 17 wherein said heating to said volatilization temperature takes place in a oxygen-containing atmosphere.

19. The method of claim 18 wherein, subsequent to the step of heating in said oxygen-containing atmosphere, the resulting laminate is heated to the annealing temperature of said magnetically soft metal.

20. The method of claim 19 wherein said annealing step is carried out in an oxygen free atmosphere.

21. The method of claim 14 wherein said laminate is heated to the annealing temperature of said magnetically soft metal.

22. The method of claim 21 wherein said annealing step occurs in an oxygen free atmosphere.

23. The method of claim 21 wherein, after said structure is heated to said annealing temperature, said structure is cooled at a controlled rate through the Curie temperature of said magnetically soft metal.

24. The method of claim 14 including the step of modifying said glass to adjust its mean coefficient of thermal expansion so that the dimensions of said magnetically soft metal and said glass differ by no more than about 500 parts per million at the operating temperature of said laminate so that the resulting magnetically soft layers are substantially stress-free.

25. The method of claim 1 including the step of incorporating a gas into the inorgnic resistive material.

26. The method of claim 25 wherein said gas is diffused into the inorganic resistive material.

27. The method of claim 25 wherein said gas is hydrogen so that said hydrogen forms a hydride.

28. The method of claim 27 wherein said hydrogen is diffused into said laminate by heating said laminate in a hydrogen rich atmosphere.

29. The method of claim 1 including the step of placing said inorganic layers in a magnetic circuit so that they function as insulators therein.

* * * * *